UNITED STATES PATENT OFFICE.

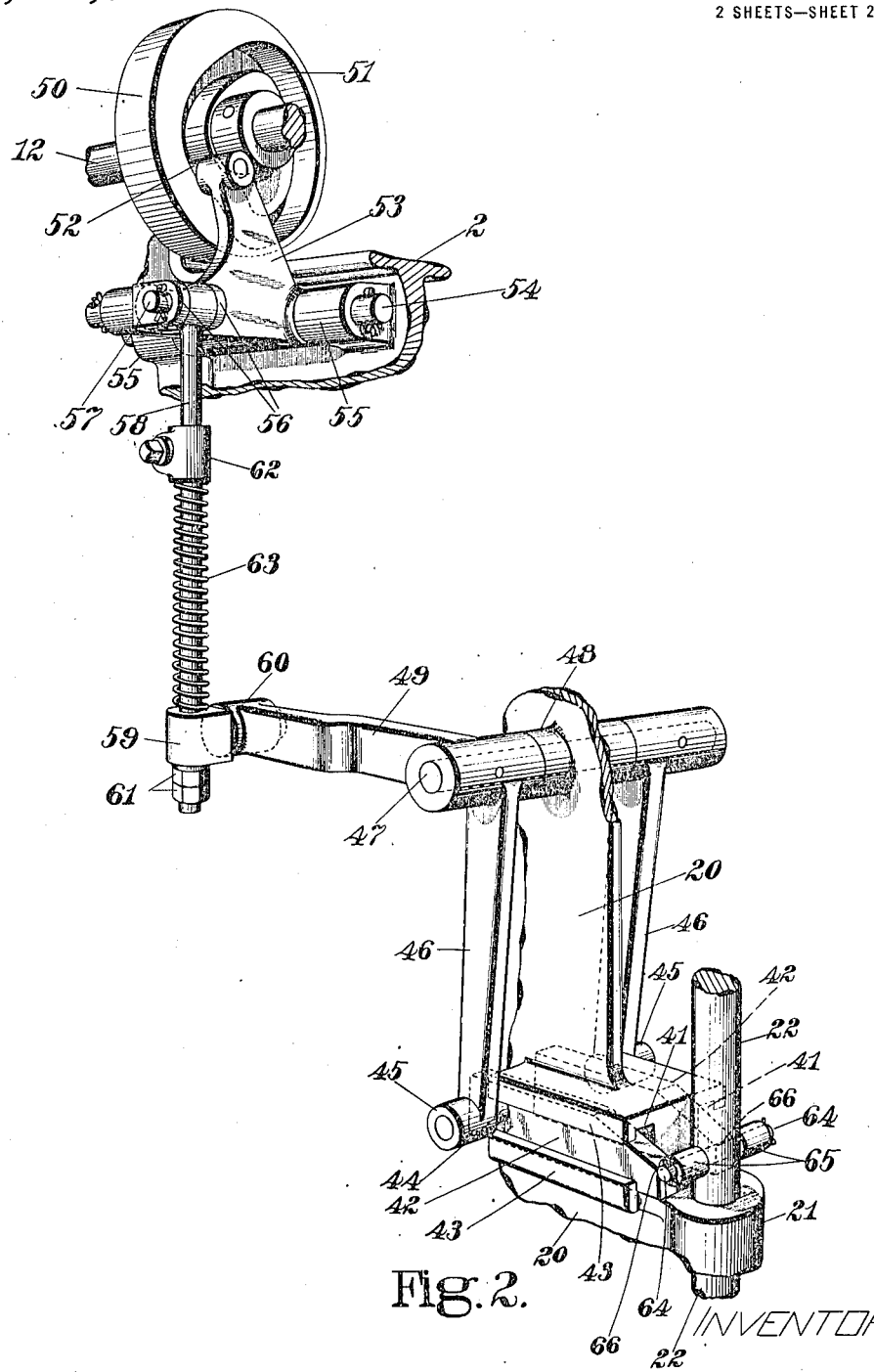

MATTHIAS BROCK, OF BOSTON, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

WORK-SUPPORT CONTROLLING AND OPERATING MECHANISM.

1,291,754.     Specification of Letters Patent.     Patented Jan. 21, 1919.

Application filed August 11, 1915. Serial No. 44,915.

*To all whom it may concern:*

Be it known that I, MATTHIAS BROCK, a citizen of the United States, residing at Boston, in the county of Suffolk and State of Massachusetts, have invented certain Improvements in Work-Support Controlling and Operating Mechanism, of which the following description, in connection with the accompanying drawings, is a specification, like reference characters on the drawings indicating like parts in the several figures.

The present invention relates to work support controlling and operating mechanisms. For the purpose of illustration, a preferred embodiment of the invention is herein shown as incorporated in a stitch-down staple lasting machine of the general type disclosed in Letters Patent No. 1,117,087, granted November 10, 1914, on an application of Adam H. Prenzel, and the general object of the invention is to provide an improved work support operating and controlling mechanism especially adapted for use in machines of this type, although it is to be understood that the invention is not limited to use in such machines.

In the use of machines of this general type, the boot or shoe in which fastenings are to be inserted is ordinarily sustained upon a work support which is raised to clamp the work against an abutment during the fastening inserting operation, and is then lowered to permit the finished shoe to be removed and another shoe to be placed upon the work support. Should the work support be not fully raised to work clamping position or should it be permitted to drop prematurely before the fastening inserting mechanism has finished its inserting operation, the fastening will be driven incompletely or improperly. It has been proposed to overcome such defective action by operatively connecting the work support to the means for actuating the fastening inserting mechanism, so that upon starting the machine the work support would be automatically raised to work clamping position and maintained in such position until the machine was stopped. It is desirable at times, however, to raise the work support manually without starting the machine, as, for instance, in the use of a stitch-down staple lasting machine of the type above mentioned, to ascertain if the driver throat or nozzle is properly positioned relatively to the boot or shoe on the work support to draw the upper tightly over the last and to locate the staple or other fastening properly in order that it may secure the upper correctly in lasted position. It is furthermore frequently desirable to operate the machine without raising the work support especially if, as in the case of the illustrated machine, the machine makes as well as inserts the fastenings, in order that fastenings such as are to be inserted by the machine may be examined.

These considerations have led to the adoption in such machines of two separate means for controlling the work support, the construction and arrangement set forth in said Letters Patent being such that the work support would first be moved manually to bring the work into engagement with the nozzle and then be given an upward thrust upon starting the machine by power operated means or, if it were not desired to utilize the manual work support raising means, upon starting the machine the automatic power driven means alone could be utilized to raise the work support, the preferable and usual practice, however, being to effect the proper adjustment of the work between the work support and the nozzle or abutment and the greater part of the wiping and relative stretching movement of these parts before starting the machine.

The present invention aims to provide an improved work support controlling and operating mechanism of this type which will insure that the work support is invariably fully raised to work clamping position before the fastening is driven and which will further insure that the work support is held firmly clamped in such operative position until the completion of the fastening inserting operation, while at the same time permitting the work support to be raised manually without starting the machine or, conversely, permitting the machine to be operated without raising the work support.

With this in view, a feature of the present invention consists in means for manually moving the work support toward or into work clamping position together with automatic means operating upon starting the machine to insure complete movement of the work support into work clamping position and to hold the work support locked in work clamping position until after the fastening has been driven. This feature of the invention insures proper work clamping during the entire fastening inserting operation and has the further advantage of relieving the operator of the labor of always manually raising the work support to full work clamping position.

To permit the operator to run the machine with the work support in lowered position whenever he desires to examine the fastenings such as are to be inserted by the fastening inserting mechanism, in accordance with another feature of the invention, the mechanism operating automatically upon starting the machine to insure complete upward movement of the work support and to lock it in work clamping position is preferably constructed and arranged to be ineffective to lift the work support unless the work support has been at least partly raised manually.

In accordance with these objects and features of the invention, the illustrated embodiment of the invention consists in wedge mechanism actuated from the means for operating the fastening inserting mechanism to insure complete elevation of the work support and hold it locked in work clamping relation to the inserting mechanism providing it has first been manually moved toward said position.

These and other objects and features of the invention will be apparent from the following description of a preferred embodiment of the invention read in connection with the accompanying drawings.

In the drawings:—

Fig. 2 is a perspective view on an enlarged scale of the means for automatically lifting and locking the work support in work clamping position, some of the parts being broken away for clearness of illustration.

Figure 1:
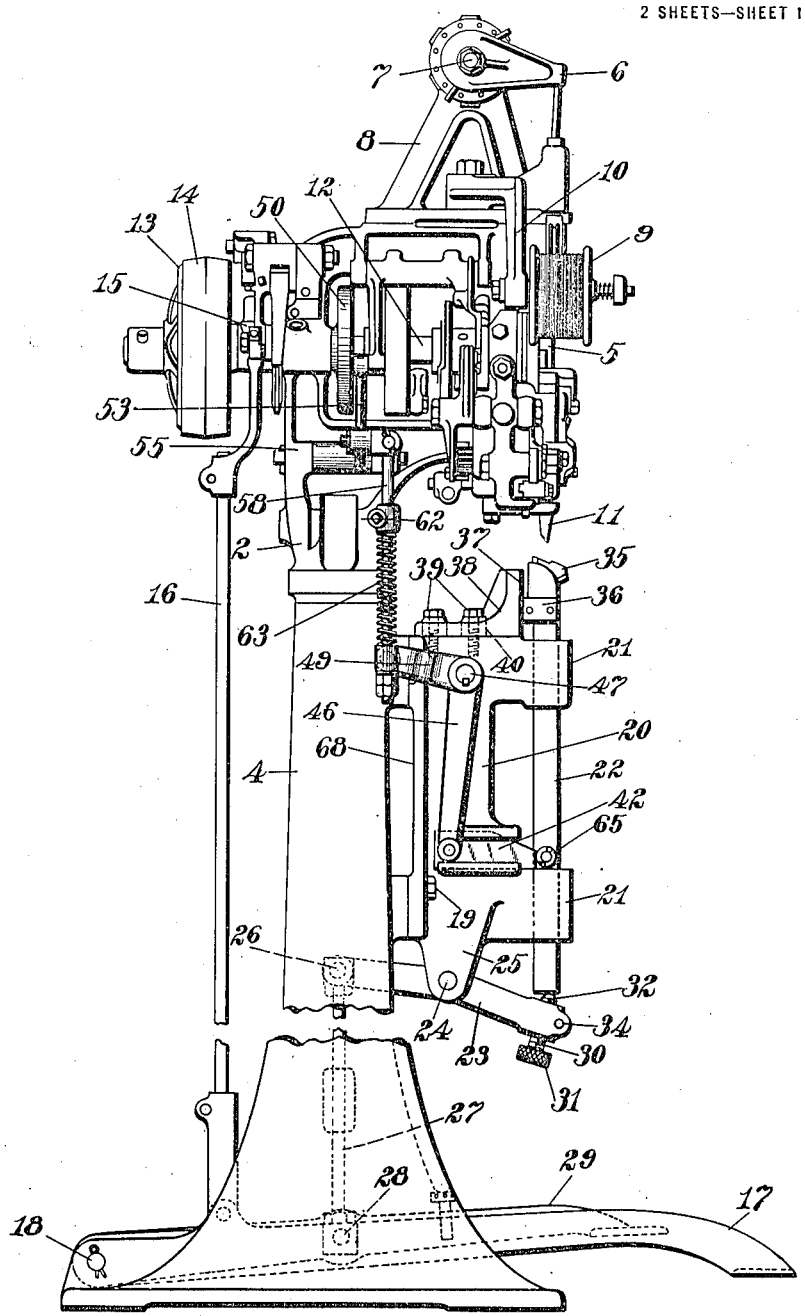
Figure 1 is a side elevation of a machine for inserting fastenings in boots and shoes having one embodiment of the present invention incorporated therein, some of the parts being broken away.

The fastening inserting mechanism may be of any well known type adapted for the insertion of fastenings into boots and shoes for securing parts together, either permanently or temporarily, whether such fastenings have been previously formed or are made in the machine which inserts them, but for convenience in the exploitation of the invention, staple forming and inserting mechanism of the type disclosed in Letters Patent, No. 1,016,930, granted Feb. 13, 1912, on an application of William H. Borden, is illustrated. This mechanism is mounted in a head 2 supported upon the column 4, and comprises a driver bar 5 carrying a driver, and actuated in its driving stroke by a spring operated arm 6 fulcrumed at 7 upon a bracket 8 carried by the head 2. The staple forming and the wire feeding mechanisms may be substantially as fully described in the Letters Patent to Borden. It is to be noted, however, that in the illustrated machine the reel 9 from which the wire is drawn, is mounted upon the front portion of the machine head by means of a bracket or arm 10 and the lead of the wire from the reel to the feeding mechanism is appropriately changed.

The staple driver operates in a lasting tool 11 having a staple guiding throat, which tool may be substantially as fully described in the said Letters Patent No. 1,117,087, to force the upper into the angle between the last and projecting margin of the sole in a stitch-down shoe and draw the upper to the rounded contour of the last.

Mounted in the head 2 is the driving shaft 12 having thereon the fast and loose clutch members 13 and 14 which are normally held in separated relation, but are adapted to be placed in operative engagement by the wedge 15 connected by the rod 16 to the starting and stopping treadle 17 pivoted to the base portion of the column 4 upon a pin or rod 18.

Secured to the column 4 by suitable means, such as the bolts 19, is a bracket 20 provided with bearing portions 21 in which is vertically movable the work supporting post 22. The lower portion of the work supporting post 22 extends below the lower bearing 21 and contacts with treadle controlled means whereby the work supporting post may be manually raised. In the present instance this means comprises a lever 23 pivoted at 24 to a lug 25 extending from the bracket 20, the rear end portion of said lever being pivotally connected at 26 to a treadle rod 27 connected at 28 to a treadle 29, the fulcrum of which is preferably established on the pin or rod 18. The free end portion of the lever 23 is provided with an adjustable device upon which the lower end of the work supporting post 22 rests. In the present instance this device comprises an adjusting screw 30 threaded into the lever 23 and provided with a hand piece 31 by which it may be turned to project or retract its end 32 to regulate the drop of the work supporting post. When adjusted the screw 30 may be secured from accidental displacement by a clamping bolt 34 passed through the split end of the lever 23.

Connected to the top portion of the work supporting post is the anvil block 35 on which the work, such as a stitch-down boot or shoe, may be sustained with the shoe bottom resting on the said anvil block during the insertion of fastenings to secure the upper to the marginal portions of the sole, substantially as described and shown in the said Letters Patent No. 1,117,087 hereinbefore referred to.

To provide substantial lateral rigidity during the lasting and inserting operations, while permitting necessary adjustments of the work, and at the same time to prevent undesirable rotative movement of the work support, the work support post 22 has bearing portions extending laterally therefrom which ride on the flat face of a bearing piece projecting from the bracket 20. In the present instance the bearing portions on the post 22 comprise the lugs 36 secured to the post above the upper bearing 21 in which the post slides, which engage the flat face 37 of an arm 38 adjustably secured to the bracket 20 by suitable means, such as the bolts 39 which pass through elongated slots 40 in the arm 38, the construction being such that the arm 38 may be properly adjusted into bearing relation with the lugs 36 which may ride on the flat face 37 of the arm as the post is raised and lowered. By this construction rotative movement of the work supporting post is prevented, and since the bearing between the lugs 36 and arm 38 is close to the work supporting portion of the post, spring action of the post under the strain of inserting fastenings into the boot or shoe is prevented.

In the use of the construction thus far described it will be apparent that upon depression of the treadle 29 the work supporting post, which as a whole may be conveniently termed the work support, will be raised manually toward the fastener inserting mechanism to clamp the work against the opposed abutment, which in the illustrated stitch-down staple lasting machine, comprises the tool 11. Thus without starting the machine the operative may then examine the relation of the work and the tool to see if the desired wiping action of the upper about the last will be secured in the operation of the machine and that the fastenings will be properly driven into the work. Having satisfied himself on these points and while still holding the work support in work clamping position, the operative will then depress the starting treadle 17, the tread of which is close to the tread of the treadle 29, to set the fastening inserting mechanism into operation. This he will do, in the illustrated form of the invention, for example, by tipping his foot to cause his heel to engage the adjacent treadle 17 while his toe still retains the treadle 29 depressed. In thus shifting his foot, or it may be his leg in case the machine operation is started by a knee lever, he is liable to let up on the treadle 29, whereupon the work support will drop to some extent, so that a fastening inserted under such conditions will fail to be completely driven or clenched. To obviate this defective action, the present invention provides means which upon starting into operation the fastening inserting mechanism, will insure that the work support is fully raised and locked in work clamping position provided the work support movement toward such position has been manually started or initiated.

This means preferably comprises a wedge yieldingly actuated from the means for operating the fastening inserting mechanism, the construction being such that should the wedge meet an unyielding obstruction to its work support raising movement as it is actuated by said means, it will fail to raise the work support to work clamping position and the fastening inserting mechanism will not insert a fastening into the boot or shoe on the work support. Insurance is thus given that if the fastening inserting mechanism inserts a fastening in the boot or shoe on the work support, such fastening will be completely driven and if it be a clenched fastening, it will be properly clenched.

The wedge means for carrying into effect this feature of the invention may be variously formed and operated from the main driving shaft. As shown the bracket 20 is provided with guideways 41, preferably one at each side of the bracket 20, in each of which is mounted for reciprocating movement a wedge 42. Each of the guideways 41 may be formed by separated upper and lower flanges 43 which thus provide a passage between them for a pin 44 secured to each wedge 42. Connected to each pin 44 at 45 is a rocker arm 46 secured to a rock shaft 47 mounted in suitable bearings 48 which may be conveniently formed in the bracket 20, sufficient play or lost motion being provided between the pins 44 and connections 45 to permit rectilinear movement of the wedges without binding of parts. The rock shaft 47 has secured thereto an arm 49 which may be yieldingly connected to suitable means actuated from the driving shaft 12 to impart to said arm 49 and through it and associated elements as described, to the wedges 42, the desired movements as will presently appear.

Secured to the main driving shaft 12 is a cam 50 having a cam path 51 engaged by a pin or roller 52 mounted on the arm 53 which is mounted for rocking movement on the machine head. As shown the arm 53 is mounted on a pin or stud 54 carried by bearings 55 projecting from the head frame 2, the construction being such that as the driving shaft is rotated and the fastening inserting mechanism is consequently operated, the arm 53 will be rocked by the cam 50. The arm 53 is yieldingly connected to the arm 49 before described, and in the present instance such connection is made by providing the arm 53 with the lugs 56 for the support of a pin 57 which passes through the upper end portion of the wedge operating rod 58, as best shown by Fig. 2. The lower portion of the rod 58 passes loosely through a rocking stud 59 mounted for rocking movement in the bearing 60 carried by the arm 49, and has mounted on its end the set nuts 61. Surrounding the rod 58 and seated at one end on the top of the rocking stud 59 and at its other end against the under side of a collar 62 adjustably secured to said rod 58, is a spring 63, the construction being such that as the cam 50 is rotated by the main driving shaft 12, the rod 58 will be reciprocated to impart to the wedges 42 reciprocating movement in their respective guides provided such movement of the wedges is not effectively obstructed. Should the wedges meet an effective obstruction sufficient to prevent such movement, the rod 58 will still be reciprocated, but instead of moving the arm 49, on the downward movement of the rod, the spring 63 will yield and simply be compressed, thus permitting the wedges to remain quiescent.

As hereinbefore noted one of the purposes of the present invention is to insure that the work support shall be fully raised to work clamping position and there held as the fastening inserting mechanism is operated, provided its movement toward such position has been manually started or initiated, but in case such movement has not been manually initiated, then to permit the work support to remain in its lowered position, so that fastenings if driven into the work at all, will be properly and completely driven. This result is secured in the present instance of the invention by providing the work supporting post with projections which, when the work support is in lowered position, will be too low to be engaged by the inclined surfaces of the wedges and consequently offer an effective obstruction to wedge movement under the action of the automatic operating means described, but which will be engaged by the inclined surfaces of the wedges, provided the work support has been manually raised or its movement toward work clamping position has been started, and by movement of said wedges beneath such projections cause the work support to be fully moved to and locked in work clamping position.

Projecting from the work supporting post 22 at the sides thereof in front of the wedges 42 are the pins 64, preferably carrying rollers 65 for engaging the wedges 42 as the latter are moved forward by the automatic means described. When the work support is in its lowered position, as for instance when the treadle 29 is not depressed by the operative, the axes of the pins and rollers are slightly below the front edges 66 of the wedge inclines, and if at such times the starting and stopping treadle 17 be depressed to start the machine, the actuating means for the wedges will be operated, but the rollers and pins on the work support will offer an effective obstruction to the wedge movement and the work support will remain in lowered position. Should the operative have manually lifted the work support to or toward work clamping position, as by depression or partial depression of the treadle 29, then the axes of the pins and rollers will have been raised sufficiently to permit the wedges to engage beneath them, as the wedges are operated from the main shaft, and thus lift the work support to full work clamping position and lock it for the insertion of fastenings.

When, therefore, it is desired to determine the relation of the work and abutment or throat when the work is in work clamping position without starting the fastening inserting mechanism into operation, the operative simply depresses the treadle 29. Should he desire to examine fastenings to be inserted without inserting them in the work, he depresses the starting and stopping treadle 17 without manually lifting the work support and thereupon the fastening inserting mechanism will be operated and discharge fastenings through the throat which may be caught in the hand of the operative and examined. At the same time the wedge actuating means will be operated but owing to the fact that the work support remains in its lowermost position, the movement of the wedge means will be obstructed and the said means will be ineffective to lift the work support. Should it be desired to insert fastenings in the work sustained on the work support the operative first depresses the treadle 29 to lift the work support manually. Thereupon he depresses the starting and stopping treadle 17 which, even if the treadle 29 has been depressed only slightly, causes the wedges to move beneath the projections on the work supporting post and lift the work into work clamping position, where it remains until the fastening is completely driven and clenched, whereupon the wedges are withdrawn, thus relieving the work from the clamping action of the automatic means and permitting it to be moved along to a position for the next fastening to be driven.

It will be apparent from the foregoing description that the lowered position of the work support may be adjusted by means of the adjusting device 30, and in case it is desired to insure that each cycle of the machine and fastening inserting mechanism shall effect automatically the upward movement of the work support to work clamping position without the operative keeping the treadle 29 depressed more or less, the adjusting device for the work support may be adjusted to position the axes of the pins and rollers 64 and 65 slightly above the horizontal plane passing through the front edge 66 of the wedge inclines. In this condition, the work support will be raised automatically to work clamping position to receive each fastening as the machine continues operation with the single treadle 17 depressed.

The work support controlling and moving means herein described, while especially advantageous in a stitch-down staple lasting machine, is also adapted for use in other forms of fastening inserting machines where the work is sustained on a work support which is movable to and from work positioning relation to a fastening inserting mechanism or an opposed abutment. In describing the invention herein, use has been made of the term "manual", to indicate acts performed by the operative and a treadle has been referred to as a means for the application or transmission of such acts, but such term is used in its general sense to include either hand, foot, or knee action of the operative.

From the construction described it will be noted that the wedge means for moving the work support and locking it with the work in operative relation to the fastening inserting mechanism is normally in inoperative relation to the means on the work support with which it coöperates until the work support movement toward the fastening inserting mechanism has been initiated.

Having thus described the invention, what is claimed as new and desired to be secured by Letters Patent of the United States is:—

1. In a machine for inserting fastenings into boots and shoes, the combination of a work support and an opposed work abutment, means for starting and stopping the machine, manually operated means for relatively moving the work support and abutment into work clamping relation, and power operated means, independent of the manually operated means and dependent for its movement upon prior manual movement of the work support, for locking the work support to the frame of the machine and in work clamping relation to the abutment.

2. In a machine for inserting fastenings into boots and shoes, the combination of fastening inserting mechanism, a work support, manually operated means for relatively moving the work support and fastening inserting mechanism into work clamping relation, and automatic means for relatively moving the work support and fastening inserting mechanism into work clamping relation constructed and arranged to become operative, while relative movement of the work support and fastening inserting mechanism is being manually initiated.

3. In a machine for inserting fastenings into boots and shoes, the combination of fastening inserting mechanism, a work support, and separate manually and power operated means for positioning the work support in operative relation with the fastening inserting mechanism, said manual and power means being so constructed and arranged that the power actuated means becomes operative at a predetermined point early in the initial work positioning movement of the work support.

4. In a machine for inserting fastenings into boots and shoes, the combination of mechanism for inserting fastenings, power driven means from which said mechanism is operated, a work support movable between a work receiving position and a position in which it supports the work in operative relation to said inserting mechanism, manually operated means for moving the work support from one position to the other, and power operated means for locking the work support with the work in operative relation to said mechanism, said work support and power operated means being constructed and arranged to prevent movement of the power operated means unless movement of the work support toward operative relation with said mechanism has been manually initiated and to provide for movement of said power operated means as soon as movement of the work support has been initiated.

5. In a machine for inserting fastenings into boots and shoes, the combination of mechanism for inserting fastenings, power means from which said mechanism is operated, a work support movable from a work receiving position to a position in which it supports the work in operative relation to said inserting mechanism, power actuated means for moving the work support to position the work for the inserting mechanism normally inoperatively related to the work support when the latter is in work receiving position, manually operated means for moving the work support toward the inserting mechanism, and a connection between the work support and its power actuated operating means constructed and arranged to prevent the operation of the support by said power actuated means when said support is in its lowest position.

6. In a machine for inserting fastenings into boots and shoes, the combination of fastening inserting mechanism, power means for operating said mechanism, starting and stopping means for said power means, a work support movable from a work receiving position to a position in which it supports the work in operative relation to said mechanism, power actuated means for moving the work support to position the work for the inserting mechanism operatively disconnected from the work support when the latter is in work receiving position, manually operated means for moving the work support from work receiving position, and means on the work support actuated by manual movement of the work support for operatively relating the said power actuated means with the work support upon starting the machine.

7. In a machine for inserting fastenings into boots and shoes, the combination of fastening inserting mechanism, power means for operating said mechanism, a starting and stopping treadle for starting and stopping said power means, a work support movable from a work-receiving position to a position in which it supports the work in operative relation to the fastening inserting mechanism, a treadle for manually moving the work support from one position to the other, and means normally locked from movement until the work support is manually moved and automatically operated from said power means upon starting the machine to hold the work support in operative relation to the fastening inserting mechanism after it has been manually moved.

8. In a machine for inserting fastenings into boots and shoes, the combination of fastening inserting mechanism, power means for operating said mechanism, a work support, wedge means actuated from said power means for moving the work support into raised position with the work in operative relation to said inserting mechanism, and a manually controlled obstruction to prevent movement of the wedge until the obstruction has been manually moved, said obstruction being independent of the power means for moving the work support.

9. In a machine for inserting fastenings into boots and shoes, the combination of fastening inserting mechanism, a work support movable from a work receiving position to a position in which it supports the work in operative relation to the inserting mechanism, a wedge, power operated means for moving the wedge, a projection on the work support to prevent movement of the wedge when the work support is in work receiving position, and manually operated means for moving the work support from work receiving position to permit the wedge to be moved and raise the work on the work support into operative relation with the inserting mechanism.

10. In a machine for inserting fastenings into boots and shoes, the combination of power operated fastening inserting mechanism, a work support movable from a work receiving position to a position in which it supports the work in operative relation to the inserting mechanism, manually operated means for moving the work support from one position to the other, a wedge having a cam action to lift the work support, and power actuated means for moving the wedge to lift and to hold the work support in operative relation to the inserting mechanism after it has been manually moved toward said position.

11. In a machine for inserting fastenings into boots and shoes, the combination of fastening inserting mechanism, a work support, power means for operating said mechanism, a wedge operative as a cam to lift the work support, means for yieldingly moving said wedge actuated from said power means, and means for manually moving the work support from a work receiving position to a position in which it supports the work in operative relation to the inserting mechanism and to permit the wedge to lock the work support in said operative relation to the inserting mechanism upon starting the power means into operation.

12. In a machine for inserting fastenings into boots and shoes, the combination of fastening inserting mechanism, power means for operating said inserting mechanism, a work support movable from a work receiving position to a position in which it supports the work in operative relation to said mechanism, manually operated means for moving the work support from one position to the other, and a wedge operative as a cam to lift the work support and to lock the same with the work in operative relation with the inserting mechanism after the work support has been manually moved.

13. In a machine for inserting fastenings into boots and shoes, the combination of power operated fastening inserting mechanism, a treadle for starting the power means into operation, a work support, a treadle for manually moving the work support to place the work supported thereby in operative relation to the inserting mechanism, said treadles being related for actuation by the foot of the operator, and power actuated wedge means operated upon starting the machine to hold the work support in operative relation to the inserting mechanism during the insertion of a fastening after manual movement of the work support.

14. In a machine for inserting fastenings into boots and shoes, the combination of fastening inserting mechanism, power means for operating said mechanism, a wedge actuated from said power means, a work support movable from a work receiving position to a position in which the work supported thereby is operatively related to the inserting mechanism, manually operated means for moving the work support from one position to the other, a projection carried by the work support to be engaged by said wedge and means for adjusting the position of said projection with relation to the wedge.

15. In a machine for inserting fastenings into boots and shoes, the combination of fastening inserting mechanism, a work support movable from a work receiving position to a position in which the work is operatively related to the fastening inserting mechanism, and dual means for moving the work support from work receiving position to operative position relative to the inserting mechanism, one of said means being manually operated and the other of which comprises a power operated wedge operative as a cam in causing movement of the work support.

16. In a machine for inserting fastenings into boots and shoes, the combination of fastening inserting mechanism, a work support movable from a work receiving position to a position in which the work supported thereby is operatively related to the inserting mechanism, and two independent means for controlling the work support, one of said means being manually operated to move the work support from work receiving position, and the other of said means comprising a power actuated wedge operative as cams to lift the work support and holding said work support in operative relation to the fastening inserting means after its movement has been manually initiated.

17. In a machine for inserting fastenings into boots and shoes, the combination of fastening inserting mechanism, a work support movable from a work receiving position to a position in which the work supported thereby is operatively related to the inserting mechanism, manually operated means for moving the work support from one position to the other, a pair of wedges, projections carried by the work support, and power means for moving the wedges to engage said projections and hold the work support in operative relation with the inserting mechanism.

18. In a fastener inserting machine having an abutment, a work support, manually operated means for moving the support to press the work against the abutment, power operated means for moving the support to clamp the work against said abutment, and means connected to the work support for controlling the operation of the power operated means.

19. In a fastener inserting machine, a work support, manually operated means for moving the support, power operated means for moving the work support, and a stop connected to the work support for preventing the operation of the power operated means.

20. In a fastener inserting machine, a work support, manually operated means for moving the support, power operated means, independent of the manually operated means, for moving the work support, and means connected to the work support for controlling the operation of the power operated means.

21. In a fastener inserting machine, a work support, manually operated means for moving the support, power operated means, independent of the manually operated means, for moving the work support, and a stop connected to the work support for preventing the operation of the power operated means.

22. In a fastener inserting machine, having a work abutment, a work support, manually operated means for moving the support, and work support operating means, independent of the manually operated means, for causing the said support to clamp the work against the abutment, the construction and arrangement being such that said work support operating means may become operative to move the work support at a predetermined point early in the movement of the work support by the manually operated means.

23. In a fastener inserting machine having a work abutment, a work support, manually operated means for moving the support, power operated means for lifting the work support to cause said support to clamp the work against the abutment, and an operative connection between the power operated means and the work support so arranged that said means can not lift the support from its lowest position.

24. In a fastener inserting machine having a work abutment, a work support, manually operated means for moving the support, power operated means for causing the said support to clamp the work against the abutment, and means on the support coöperating with the power operated means to lift the support and serving to prevent operation of the power operated means when the support is in its lowest position.

25. In a fastener inserting machine having a work abutment, a work support, manually operated means for moving the support, a yieldingly operated means for moving the work support, and means on the support coöperating with the yieldingly operated means to move the support and serving as a stop to prevent operation of the yieldingly operated means until said stop is withdrawn by the manually operated means.

26. In a fastener inserting machine, a work abutment, a work support, manually operated means for pressing the work against the abutment, power operated means, independent of the manually operated means, for moving the work support to clamp the work firmly against the abutment, and means on the work support to control the operation of the power operated means.

27. In a fastener inserting machine, a work abutment, a work support, manually operated means for moving the work support to press the work against the abutment, and power operated means for moving the work support comprising a wedge slidably mounted on a fixed part of the machine frame, the arrangement being such that the wedge is moved to hold the support firmly against the abutment after movement of the support is initiated by the manually operated means.

28. In a fastener inserting machine having an abutment, a work support, manually operated means for effecting preliminarily movement of the support to press the work against the abutment, and power operated means for moving the work support, inoperable when the work support is in its lowest position but operable while the support is descending toward said position under control of said manually operated means, to raise and clamp the work against said abutment.

29. In a fastener inserting machine having an abutment, a work support, manually operated means for moving the work support, and power operated means controlled by the work support for causing movement of the work support toward said abutment to effect final work clamping pressure and to maintain said pressure until the fastening is driven.

30. In a fastener inserting machine having an abutment, a work support, manually operated means for preliminarily moving the work support toward the abutment, and power operated means controlled by the work support for completing the movement of the work support toward said abutment to establish the work in final work clamping relation to the abutment for the insertion of the fastening.

In testimony whereof I have signed my name to this specification.

MATTHIAS BROCK.